US012709831B2

(12) United States Patent
Schuster et al.

(10) Patent No.: US 12,709,831 B2
(45) Date of Patent: Aug. 18, 2026

(54) DOOR GASKET ASSEMBLY FOR A WASHING MACHINE APPLIANCE

(71) Applicant: Haier US Appliance Solutions, Inc., Wilmington, DE (US)

(72) Inventors: Rainer Schuster, Durlangen (DE); Todd Anthony Reger, Crestwood, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 182 days.

(21) Appl. No.: 18/485,624

(22) Filed: Oct. 12, 2023

(65) Prior Publication Data

US 2025/0122661 A1 Apr. 17, 2025

(51) Int. Cl.

*D06F 37/22* (2006.01)
*D06F 37/26* (2006.01)
*D06F 39/08* (2006.01)
*D06F 39/14* (2006.01)
*F16J 15/06* (2006.01)

(52) U.S. Cl.

CPC .......... *D06F 37/266* (2013.01); *D06F 37/267* (2013.01); *D06F 39/083* (2013.01); *D06F 39/088* (2013.01); *D06F 39/14* (2013.01); *F16J 15/06* (2013.01)

(58) Field of Classification Search

None
See application file for complete search history.

(56) References Cited

U.S. PATENT DOCUMENTS 8,997,290 B2 4/2015 Kim et al.
11,408,115 B2 * 8/2022 Tartuferi ............... D06F 37/266
11,466,393 B2 10/2022 Chiorino et al.
2008/0053161 A1 3/2008 Dahlke et al.
2011/0100070 A1 * 5/2011 Kim ...................... D06F 39/088 68/200
2022/0098785 A1 * 3/2022 Kim ........................ D06F 39/40

FOREIGN PATENT DOCUMENTS

CN 115387083 A * 11/2022 ............... A61L 2/04
EP 2418314 A1 * 2/2012 ........... D06F 37/266

OTHER PUBLICATIONS

CN 115387083 A Espacenet translation, Drum Washing Machine, MA (Year: 2022).*
EP 2418314 A1 Espacenet translation, Washing Machine With a Sealing Ring, Aring (Year: 2012).*
KR 20050050904 A, Gasket for Door in Clothes Dryer, Ahn (Year: 2005).*

* cited by examiner

*Primary Examiner* — Cristi J Tate-Sims
(74) *Attorney, Agent, or Firm* — Dority & Manning, P.A.

(57) ABSTRACT

A washing machine appliance includes a cabinet comprising a front panel defining a chamber opening, a wash tub positioned within the cabinet and defining a wash chamber, a wash basket rotatably mounted within the wash tub for receiving a load of clothes, a door rotatably mounted to the front panel for providing selective access to the wash chamber through the chamber opening, and a door gasket assembly positioned between the front panel and the door. The door gasket assembly includes a gasket surrounding the chamber opening, the gasket defining an aperture and a component mounting bracket positioned within the aperture of the gasket, the component mounting bracket defining a plurality of mounting ports for receiving auxiliary components through the door gasket assembly.

15 Claims, 5 Drawing Sheets

DOOR GASKET ASSEMBLY FOR A WASHING MACHINE APPLIANCE

FIELD OF THE INVENTION

The present subject matter relates generally to washing machine appliances, or more specifically, to the gasket assembly of a washing machine appliance.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle, a drain pump assembly may operate to discharge water from within sump.

Certain conventional washing machine appliances include a gasket to provide a fluid seal between a front panel of the cabinet and the door. For example, front load washing machine appliances commonly include such a gasket mounted to the front panel around an opening to the wash chamber. Notably, several components are typically mounted in the main door gasket, e.g., including nozzles to introduce water into the wash chamber, tub lights, etc. These components typically pass through gasket, e.g., through apertures in the gasket that receive each respective component. Notably, each aperture introduces potential leak points in the gasket, and with an increase in system components, result in gasket designs that are far too complex. In addition to additional potential leak paths, more tooling is required to create the multiple apertures and component housings, and additional labor is required to install the multiple nozzles and housings.

Accordingly, a washing machine appliance having an improved door gasket would be desirable. More specifically, a door gasket that is capable of receiving multiple components with reduced costs, assembly times, and potential leak points would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided including a cabinet comprising a front panel defining a chamber opening, a wash tub positioned within the cabinet and defining a wash chamber, a wash basket rotatably mounted within the wash tub for receiving a load of clothes, a door rotatably mounted to the front panel for providing selective access to the wash chamber through the chamber opening, and a door gasket assembly positioned between the front panel and the door. The door gasket assembly includes a gasket surrounding the chamber opening, the gasket defining an aperture and a component mounting bracket positioned within the aperture of the gasket, the component mounting bracket defining a plurality of mounting ports for receiving auxiliary components through the gasket.

In another exemplary embodiment, a door gasket assembly for a washing machine appliance is provided. The washing machine appliance includes a cabinet comprising a front panel defining a chamber opening and a door rotatably mounted to the front panel for providing selective access to a wash chamber through the chamber opening. The door gasket assembly includes a gasket surrounding the chamber opening, the gasket defining an aperture and a component mounting bracket positioned within the aperture of the gasket, the component mounting bracket defining a plurality of mounting ports for receiving auxiliary components through the gasket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
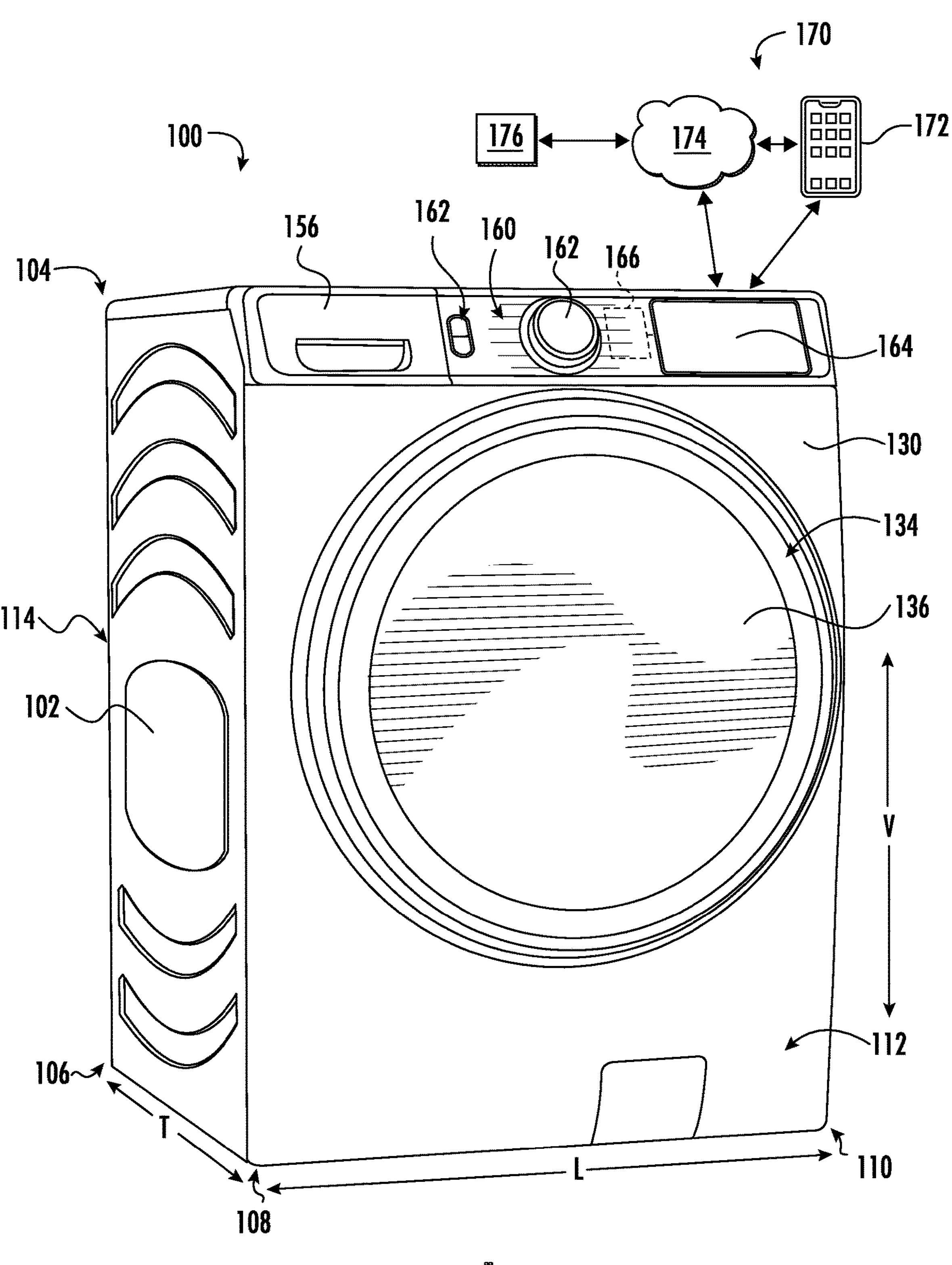
FIG. 1 provides a perspective view of a washing machine appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
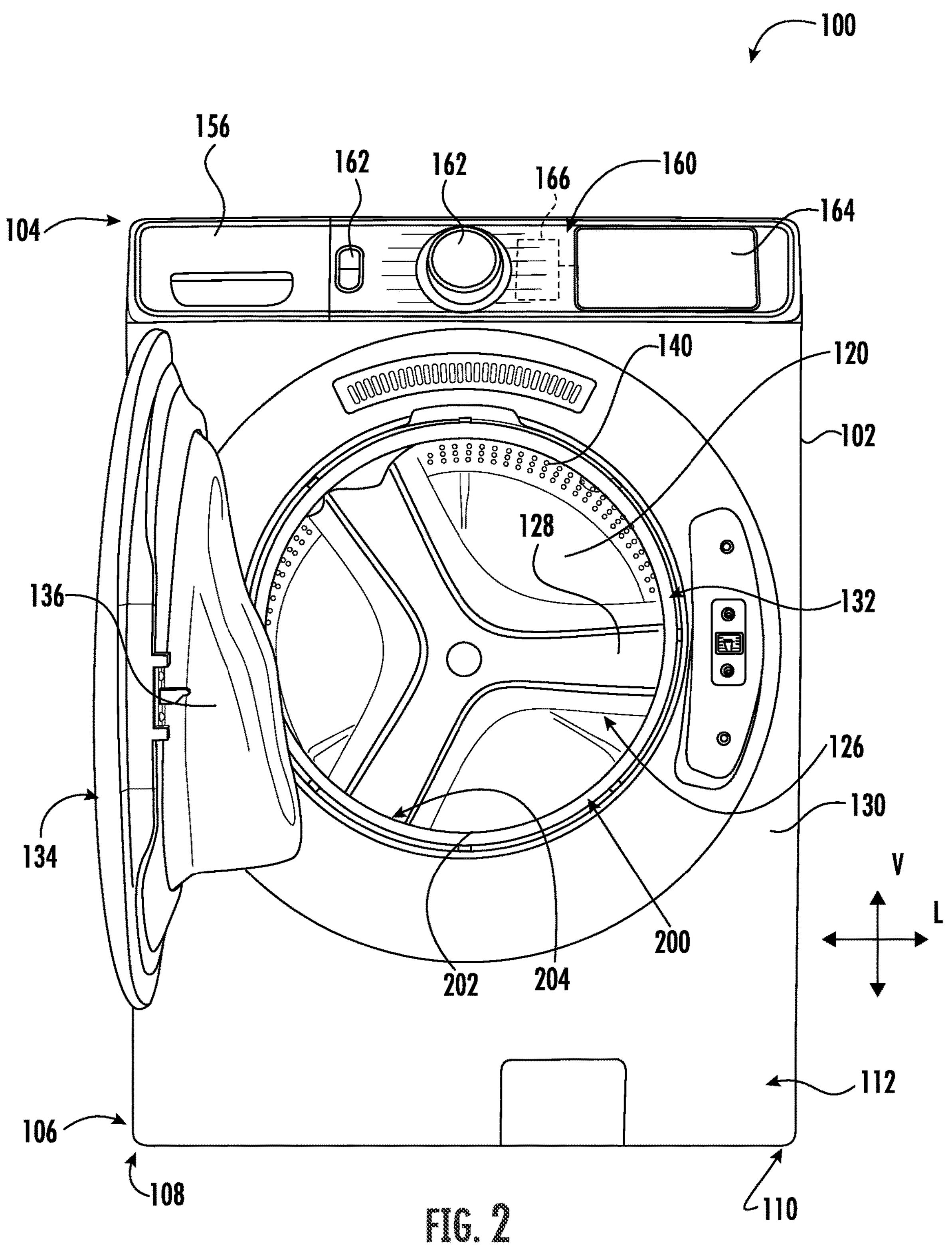
FIG. 2 provides a front view of the example washing machine appliance of FIG. 1 with a door in the open position according to an example embodiment of the present subject matter.
Figure 3:
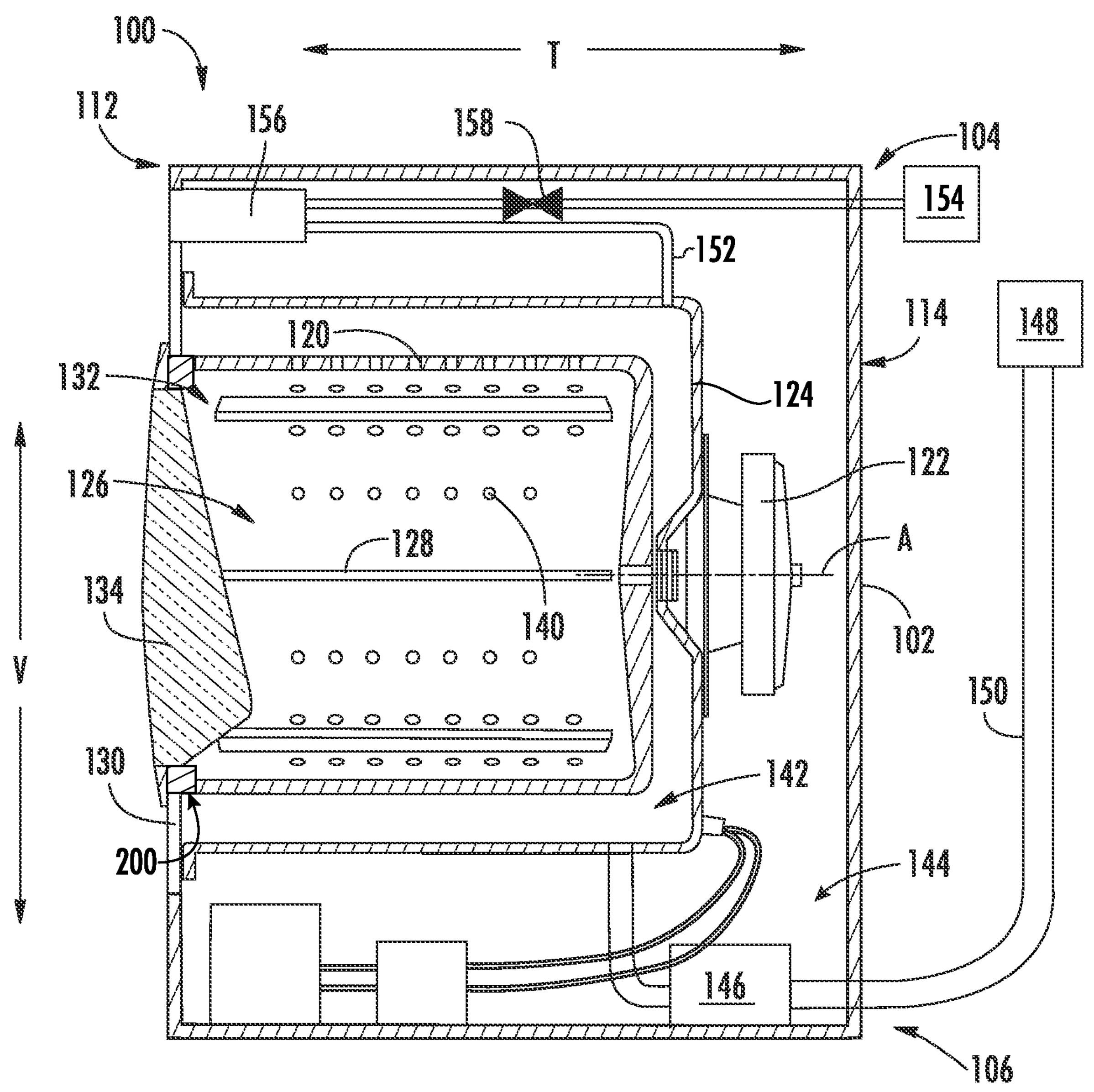
FIG. 3 provides a side cross-sectional view of the example washing machine appliance of FIG. 1 according to an example embodiment of the present subject matter.

Referring now to the figures, FIG. 1 is a perspective view of an exemplary horizontal axis washing machine appliance 100, FIG. 2 is a front view of washing machine appliance 100, and FIG. 3 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIGS. 2 and 3, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 3, a plurality of ribs 128 extends from basket 120 into wash chamber 126. In this manner, for example, ribs 128 may lift articles disposed in wash basket 120 during rotation of wash basket 120.

Referring generally to FIGS. 1 through 3, cabinet 102 also includes a front panel 130 which defines a chamber opening 132 that permits user access to wash basket 120 of wash tub 124. More specifically, washing machine appliance 100 includes a door 134 that is positioned over chamber opening 132 and is rotatably mounted to front panel 130. In this manner, door 134 permits selective access to chamber opening 132 by being movable between an open position (FIG. 2) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not labeled) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 3, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 3, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users.

Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through chamber opening 132, and washing operation is initiated through operator manipulation of input selectors 162. Wash tub 124 is filled with water, detergent, and/or other fluid additives, e.g., via spout 152 and or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain pump assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through chamber opening 132.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances.

Referring still to FIG. 1, a schematic diagram of an external communication system 170 will be described according to an exemplary embodiment of the present subject matter. In general, external communication system 170 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 170 may be used to transfer data or other information to improve performance of one or more external devices or appliances and/or improve user interaction with such devices.

For example, external communication system 170 permits controller 166 of washing machine appliance 100 to communicate with a separate device external to washing machine appliance 100, referred to generally herein as an external device 172. As described in more detail below, these communications may be facilitated using a wired or wireless connection, such as via a network 174. In general, external device 172 may be any suitable device separate from washing machine appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with washing machine appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control washing machine appliance 100, etc. In addition, external device 172 and remote server 176 may communicate with washing machine appliance 100 to communicate similar information.

In general, communication between washing machine appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with washing machine appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP. SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now specifically to FIGS. 2 through 6, a door gasket assembly 200 that may be used with washing machine appliance 100 will be described according to example embodiments of the present subject matter. As explained above, door 134 may be rotatably mounted to front panel 130 for providing selective access to chamber opening 132. Door gasket assembly 200 may be positioned between front panel 130 and door 134 for providing a fluid seal between door 134 and cabinet 102 when door 134 is in the closed position. Notably, as also explained above, it may be desirable to mount one or more components washing machine appliance 100 within the gasket to perform various functions of washing machine appliance 100. However, conventional gasket mounting techniques introduce multiple leak points, increase tooling costs, and complicate the assembly process. Accordingly, aspects of the present subject matter are directed to door gasket assembly 200 and features for addressing these and other issues experienced conventional door gaskets.

According to example embodiments, door gasket assembly 200 may include a gasket 202 that surrounds chamber opening 132. Gasket 202 may generally be made from a resilient material such that it flexes to form a fluid seal when door 134 is closed. For example, gasket 202 may be made from rubber or any other suitably resilient material capable of forming a fluid seal. Gasket 202 may generally define a perimeter 204 that surrounds or encircles chamber opening 132. For example, gasket 202 may be mounted to front panel 130, e.g., such that at least a portion of gasket 202 extends forward of front panel 130 for engaging door 134 as it is moved toward the closed position.

As illustrated, door gasket assembly 200 may further include a component mounting bracket 210 that is positioned within an aperture 212 defined through gasket 202. It should be appreciated that component mounting bracket 210 may be formed from any suitably rigid material. For example, according to exemplary embodiments, component mounting bracket 210 may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of component mounting bracket 210 may be formed from any other suitable rigid material, e.g., using an additive manufacturing process.

Figures 4, 5:
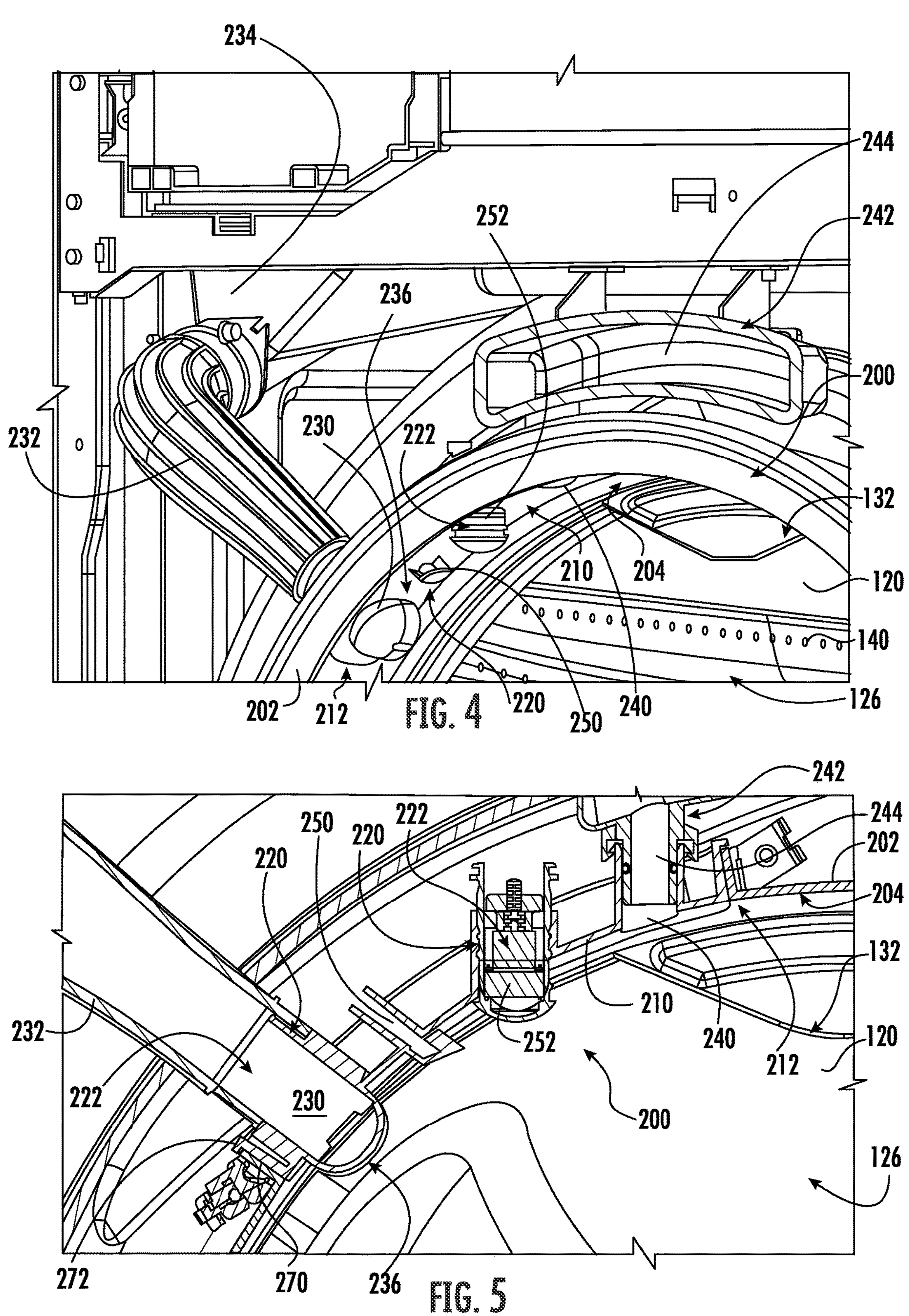
FIG. 4 provides a perspective view of the example washing machine appliance of FIG. 1 with a front panel removed to reveal a door gasket assembly according to an example embodiment of the present subject matter.
FIG. 5 provides a cross-sectional view of the example washing machine appliance and door gasket assembly of FIG. 4 according to an example embodiment of the present subject matter.
Figure 6:
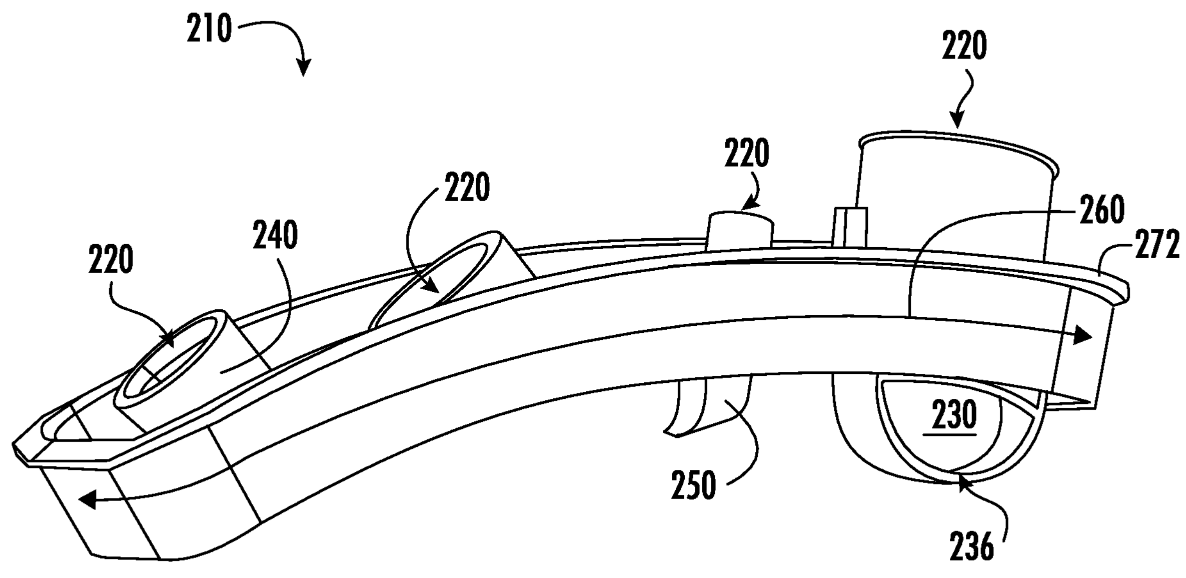
FIG. 6 provides a perspective view of a component mounting bracket of the example door gasket assembly of FIG. 4 according to an example embodiment of the present subject matter.

As best illustrated in FIGS. 4 through 6, component mounting bracket 210 defines a plurality of mounting ports 220, each of which is generally configured for receiving one or more auxiliary components 222 that pass through gasket 202. Notably, contrary to conventional designs, door gasket assembly 200 may facilitate the installation of a plurality of auxiliary components 222 while simplifying assembly, producing manufacturing and tooling costs, and reducing or eliminating leak points within gasket 202. Although exemplary auxiliary components 222 are described below, it should be appreciated that these components are intended only to facilitate discussion of aspects of the present subject matter. Component mounting bracket 210 may be configured to receive other auxiliary components 222 while remaining within the scope of the present subject matter.

According to the illustrated embodiment, auxiliary components 222 may include a main water fill nozzle 230 for injecting water and/or detergent directly into wash tub 124. Specifically, as illustrated, washing machine appliance 100 may include a fill hose 232 which is fluidly connected to a detergent dispenser 234. Fill hose 232 may be configured for directly coupling to main water fill nozzle 230. In addition, main water fill nozzle 230 may terminate in a curved or scooped discharge 236 for directing a flow of wash fluid directly into wash chamber 126.

As illustrated, auxiliary components 222 may further include an air vent port 240 that is fluidly coupled to an air vent system 242 for discharging chamber air to an ambient environment. In this regard, air vent system 242 may include a drum ventilation duct 244 that is received within the vent port 240 at a top of chamber opening 132. Air vent system 242 may further include a fan or blower (not shown) that is configured to selectively draw chamber air through vent port 240 and drum ventilation duct 244 before discharging it into the ambient environment, e.g., between front panel 130 and door 134.

Auxiliary components 222 may further include a door glass rinse nozzle 250 that is generally directed toward window 136 of door 134. In this regard, door glass rinse nozzle 250 may be oriented toward window 136 for urging a pressurized stream of water onto window 136, e.g., to remove lint, detergent, bubbles, or other grime for improved visibility into wash chamber 126. This water may also help reduce friction between window 136 and the tumbling load of clothes. As shown, door glass rinse nozzle 250 may discharge in a direction opposite of main water fill nozzle 230.

Auxiliary components 222 may further include a recirculation nozzle (not labeled, similar to main water fill nozzle 230 and/or door glass rinse nozzle 250) that is generally directed into wash chamber 126. In this regard, the recirculation nozzle may be fluidly coupled to a recirculation system and recirculation pump for receiving recirculated water from sump 142. In this manner, wash fluid may be recirculated within washing machine appliance 100 for improved water efficiency.

Auxiliary components 222 may further include a tub light 252 for selectively illuminating wash chamber 126. In this regard, tub light 252 may be seated within mounting port 220 such that the electrical connections are maintained on the backside of gasket 202 while the bulb extends into chamber opening 132 for illuminating wash chamber 126. Notably, all the above-described auxiliary components 222 are only examples and are not intended to limit the scope of the present subject matter in any manner. In addition, it should be appreciated that component mounting bracket 210 may be injection molded such that mounting ports 220 are custom fit to each respective auxiliary component 222, e.g., to ensure a fluid tight seal and the elimination of leaks.

Notably, by using a single component mounting bracket 210 positioned within a single aperture 212 of gasket 202, gasket 202 may have improved rigidity with a decreased likelihood of leaks. In addition, the assembly process and molding process may be simplified. Moreover, it should be appreciated that more components may be positioned within a smaller portion of gasket 202. For example, according to the illustrated embodiment, component mounting bracket 210 may generally extend along an arc length 260 (see FIG.

6) that is a small portion of perimeter 204 of gasket 202. For example, arc length 260 may be less than 40%, less than 30%, less than 25%, less than 20%, less than 15%, less than 10%, or less than the perimeter 204 of gasket 202. In addition, according to the illustrated embodiment, component mounting bracket 210 may be positioned proximate a top of chamber opening 132, e.g., such that the likelihood of leaks is further reduced.

It should also be appreciated that gasket 202 and component mounting bracket 210 may include complementary features for ensuring a good engagement between these components. For example, gasket 202 may generally define a sealing flange 270 that surrounds component mounting bracket 210 and component mounting bracket 210 may define a retention lip 272 that seats against the sealing flange 270 of gasket 202. In this manner, component mounting bracket 210 may be securely mounted to gasket 202 quickly and easily while reducing the potential for leaks. In addition, it should be appreciated that component mounting bracket 210 may define features for ensuring good engagement with auxiliary components 222, such as unique geometries of mounting ports 220, sealing flanges, and other engagement features.

As explained herein, aspects of the present subject matter are generally directed to a multi-nozzle housing design positioned in a main door gasket of a front load washing machine. This gasket assembly including the multi-nozzle housing simplifies the design and assembly process by combining the desired components (e.g., such as the main fill nozzle, the door glass nozzle, the tub light, the vent port, etc.) into a single housing. Additionally, this design results in fewer potential leak paths and a reduced tooling requirement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:

a cabinet comprising a front panel defining a chamber opening;

a wash tub positioned within the cabinet and defining a wash chamber;

a wash basket rotatably mounted within the wash tub for receiving a load of clothes;

a door rotatably mounted to the front panel for providing selective access to the wash chamber through the chamber opening; and a door gasket assembly positioned between the front panel and the door, the door gasket assembly comprising:

a gasket surrounding the chamber opening, the gasket defining an aperture, wherein the gasket defines a sealing flange that extends outward along a radial direction; and a component mounting bracket positioned within the aperture of the gasket, the component mounting bracket being seated against an outer radial surface of the gasket against the sealing flange, and the component mounting bracket defining a plurality of mounting ports for receiving auxiliary components through the gasket, wherein the auxiliary components comprise an air vent port fluidly coupled to an air vent system for discharging chamber air to an ambient environment.

2. The washing machine appliance of claim 1, wherein the auxiliary components comprise:

a main water fill nozzle directed into the wash chamber.

3. The washing machine appliance of claim 1, wherein the auxiliary components comprise:

a door glass rinse nozzle directed toward a window of the door.

4. The washing machine appliance of claim 1, wherein the auxiliary components comprise:

a tub light for illuminating the wash chamber.

5. The washing machine appliance of claim 1, wherein the component mounting bracket extends along an arc length that is less than 25 percent of a perimeter of the gasket.

6. The washing machine appliance of claim 5, wherein the arc length is less than 15 percent of the perimeter of the gasket.

7. The washing machine appliance of claim 1, wherein the component mounting bracket defines a retention lip that seats against the sealing flange of the gasket.

8. The washing machine appliance of claim 1, wherein the door gasket assembly is mounted to the front panel and the component mounting bracket is positioned proximate a top of the chamber opening.

9. The washing machine appliance of claim 1, wherein the component mounting bracket is injection molded.

10. A door gasket assembly for a washing machine appliance, the washing machine appliance comprising a cabinet comprising a front panel defining a chamber opening and a door rotatably mounted to the front panel for providing selective access to a wash chamber through the chamber opening, the door gasket assembly comprising:

a gasket surrounding the chamber opening, the gasket defining an aperture, wherein the gasket defines a sealing flange that extends outward along a radial direction; and a component mounting bracket positioned within the aperture of the gasket, the component mounting bracket being seated against an outer radial surface of the gasket against the sealing flange, and the component mounting bracket defining a plurality of mounting ports for receiving auxiliary components through the gasket, wherein the auxiliary components comprise an air vent port fluidly coupled to an air vent system for discharging chamber air to an ambient environment.

11. The door gasket assembly of claim 10, wherein the auxiliary components comprise:

a main water fill nozzle directed into the wash chamber.

12. The door gasket assembly of claim 10, wherein the auxiliary components comprise:

a door glass rinse nozzle directed toward a window of the door.

13. The door gasket assembly of claim 10, wherein the auxiliary components comprise:

a tub light for illuminating the wash chamber.

14. The door gasket assembly of claim 10, wherein the component mounting bracket extends along an arc length that is less than 25 percent of a perimeter of the gasket.

15. The door gasket assembly of claim 10, wherein the component mounting bracket defines a retention lip that seats against the sealing flange of the gasket.

* * * * *